(12) United States Patent
Booth et al.

(10) Patent No.: US 7,602,849 B2
(45) Date of Patent: Oct. 13, 2009

(54) ADAPTIVE REFERENCE PICTURE SELECTION BASED ON INTER-PICTURE MOTION MEASUREMENT

(75) Inventors: Simon Booth, Mississauga (CA); Guy Cote, Elora (CA)

(73) Assignee: LSI Corporation, Milpitas, CA (US)

( * ) Notice: Subject to any disclaimer, the term of this patent is extended or adjusted under 35 U.S.C. 154(b) by 998 days.

(21) Appl. No.: 10/714,736

(22) Filed: Nov. 17, 2003

(65) Prior Publication Data

US 2005/0105618 A1 May 19, 2005

(51) Int. Cl.
*H04N 7/12* (2006.01)
*H04N 7/32* (2006.01)

(52) U.S. Cl. .................. 375/240.16; 348/699

(58) Field of Classification Search .......... 348/699, 348/409, 420, 384, 390, 400, 401, 402, 407, 348/410, 411, 413, 415, 416, 700; 382/232, 382/236, 238; 375/240.24, 240.16, 240.12, 375/240.01, 240.02

See application file for complete search history.

(56) References Cited

U.S. PATENT DOCUMENTS

| | | | |
|---|---|---|---|
| 5,155,593 A * | 10/1992 | Yonemitsu et al. | 375/240.13 |
| 5,598,514 A | 1/1997 | Purcell | 395/118 |
| 5,604,540 A | 2/1997 | Howe | 348/405 |
| 5,719,630 A * | 2/1998 | Senda | 348/416 |
| 5,761,398 A | 6/1998 | Legall | 395/114 |
| 5,872,604 A | 2/1999 | Ogura | |
| 6,014,181 A | 1/2000 | Sun | 348/699 |
| 6,049,362 A * | 4/2000 | Butter et al. | 348/699 |
| 6,101,276 A * | 8/2000 | Adiletta et al. | 382/236 |
| 6,219,103 B1 * | 4/2001 | Sugiyama | 348/452 |
| 6,380,986 B1 | 4/2002 | Minami et al. | |
| 6,563,872 B2 * | 5/2003 | Suzuki | 375/240.03 |
| 6,591,015 B1 | 7/2003 | Yasunari et al. | 382/236 |
| 6,842,483 B1 | 1/2005 | Au et al. | 375/240.16 |
| 7,039,246 B2 * | 5/2006 | Mauro et al. | 382/236 |
| 7,106,800 B2 * | 9/2006 | Yoneyama | 375/240.26 |
| 2001/0002922 A1* | 6/2001 | Hayashi | 375/240.16 |

OTHER PUBLICATIONS

"Motion Estimation Method and System for MPEG Video Streams", Simon Booth, Lowell Winger, Michael Gallant, Eric Pearson, filed Jul. 17, 2002, U.S. Appl. No. 10/196,731.

"Complexity and PSNR-Comparison of several Fast Motion Estimation Algorithms for MPEG-4", Peter M. Kuhn et al., Oct. 1998, 14 pages.

"A 1.2-W Single-Chip MPEG2 MP@ML Video Encoder LSI Including Wide Search Range (H:±288, V:±96) Motion Estimation and 81-MOPS Controller", Eiji Ogura et al., IEEE Journal of Solid-State Circuits, vol. 33, No. 11, Nov. 1998, pp. 1765-1771.

* cited by examiner

*Primary Examiner*—Behrooz Senfi
(74) *Attorney, Agent, or Firm*—Christopher P. Maiorana, PC

(57) ABSTRACT

An apparatus comprising a first circuit and a second circuit. The first circuit may be configured to generate a control signal in response to a measurement of inter-picture motion between a current picture and a first reference picture. The second circuit may be configured to select the first reference picture or a second reference picture as a better reference picture for motion estimation in response to the control signal.

23 Claims, 8 Drawing Sheets

US 7,602,849 B2

ADAPTIVE REFERENCE PICTURE SELECTION BASED ON INTER-PICTURE MOTION MEASUREMENT

FIELD OF THE INVENTION

The present invention relates to video generally and, more particularly, to an adaptive reference picture selection based on inter-picture motion measurement.

BACKGROUND OF THE INVENTION

Recent video compression standards (e.g., H.264) support multiple reference pictures for motion estimation and compensation. In general, a reference picture that correlates best to the current picture should be chosen. In interlaced video, each frame of video consists of two pictures: a top field and a bottom field. Whether a picture is a top field or a bottom field is referred to as its parity. Generally, the most appropriate options for the reference picture are the temporally previous field of the same parity, or the temporally previous field regardless of parity. In practical video encoders, it is not feasible to perform motion estimation using all possible reference pictures and choose the best result. Also, in order to take advantages of some implemental efficiencies, some video encoders can require that motion estimation be perform with respect to the same reference picture for every macroblock within a picture. Therefore, the reference picture must be selected before performing motion estimation for each picture.

It would be desirable to have a video encoder that automatically selects the most appropriate field picture to be used for motion estimation for field-encoded interlace video.

SUMMARY OF THE INVENTION

The present invention concerns an apparatus comprising a first circuit and a second circuit. The first circuit may be configured to generate a control signal in response to a measurement of inter-picture motion between a current picture and a first reference picture. The second circuit may be configured to select the first reference picture or a second reference picture as a better reference picture for motion estimation in response to the control signal.

The objects, features and advantages of the present invention include providing adaptive picture selection based on inter-picture motion that may (i) select a reference picture parity according to a measurement of inter-picture motion, (ii) analyze a low-resolution inter-picture motion search to provide a measurement of inter-picture motion, (iii) provide better video compression efficiency by directing motion estimation to the better of two reference pictures, (iv) select a reference picture according to a measurement of global inter-picture motion and/or (v) be sufficiently flexible to use any reasonable estimate of inter-picture motion.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

When a video sequence exhibits high motion, each current field typically has the highest correlation to the temporally closest reference field. However, in a video sequence where there is little motion, the previous field of the same parity will generally correlate best with the current field. The present invention generally estimates the overall motion between two successive pictures of an interlaced video sequence. When the estimate of overall motion is high, the temporally previous picture is presumed to correlate best with the current picture, and, therefore, the temporally previous picture is used as the reference picture for motion estimation. Conversely, when the estimate of overall motion is low, the previous same parity field is presumed to correlate better with the current field, and the previous same parity field is used for motion estimation.

The level of overall motion may be estimated in many ways, including by analysis of motion vectors used in encoding previous frames. The present invention, in one embodiment, estimates the level of overall motion by analyzing the results of motion estimation of a decimated version of the original picture and the temporally previous reference picture.

Figure 1:
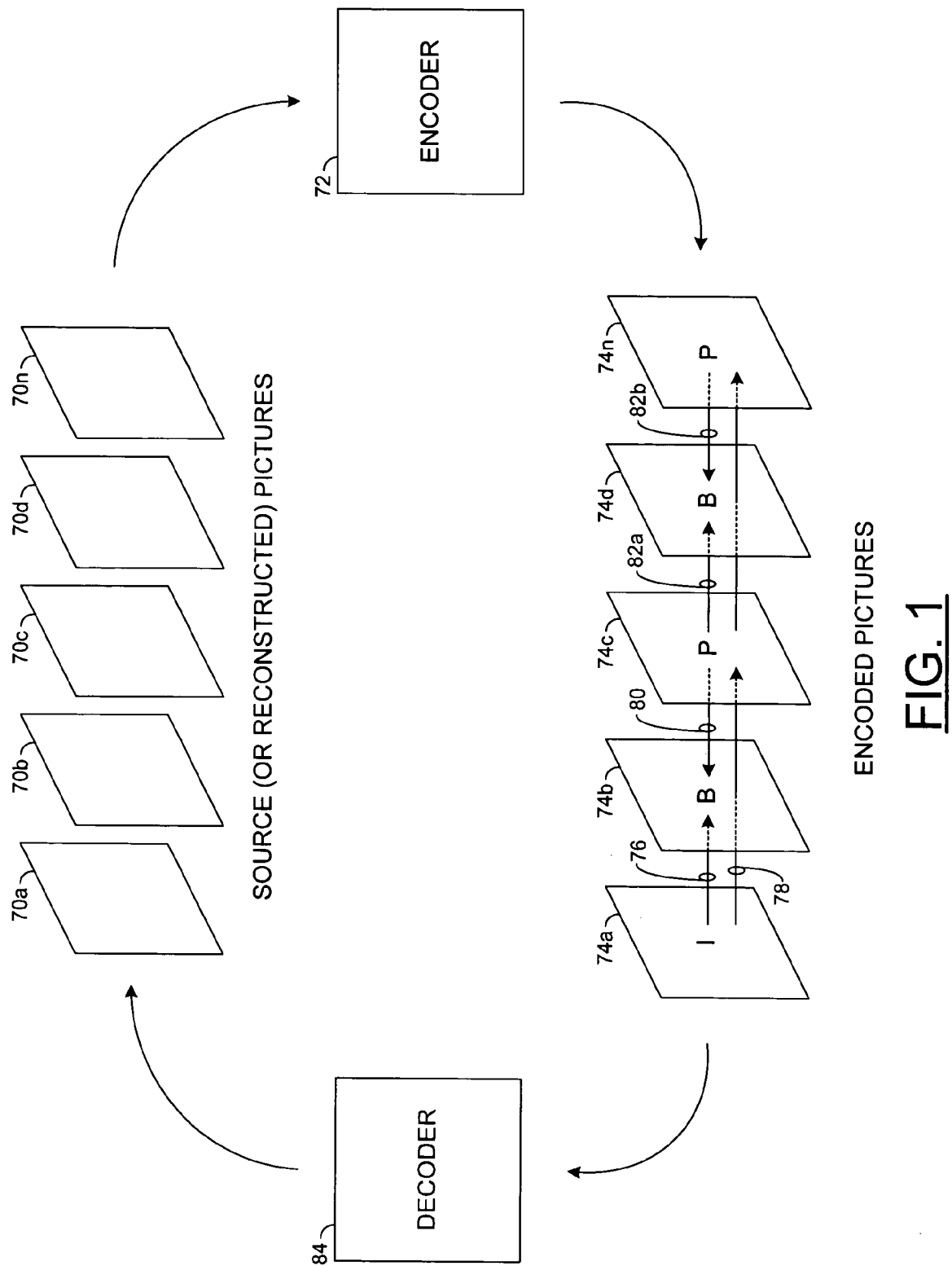
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures 70a-n. The source pictures may also be referred to as images, frames, a group-of-pictures (GOP) or a sequence. The pictures generally comprise contiguous rectangular arrays of pixels (i.e., picture elements). Compression of digital video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psycho-visual redundancy, due to properties of the human visual system (HVS).

Video frames generally comprise three rectangular matrices of pixel data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The term parity as used herein generally refers to whether a respective field picture comprises a top or bottom (or odd or even) field. The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures 70a-n may be presented to an encoder 72. The encoder 72 may be configured to generate a series of encoded pictures 74a-n in response to the source pictures 70a-n, respectively. For example, the encoder 72 may be configured to generate the encoded pictures 74a-n using a compression standard (e.g., MPEG-2, MPEG-4, H.264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 74b and the P-picture 74c may be predicted using the I-picture 74a (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82a and 82b, respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is generally not time, but rather how many frames are stored in a buffer so that the frames may be decoded in a different order than the frames are displayed. In one example, the frames may be referenced forward in time. In another example, the frames may be referenced backward in time (e.g., re-ordering the frames).

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264. In many cases an important distinction is between reference and non-reference frames.

The encoded pictures 74a-n may be presented to a decoder 84. The decoder 84 is generally configured to generate a series of reconstructed pictures corresponding to the source pictures 70a-70n (e.g., images, frames, fields, etc.) in response to the encoded pictures. In one example, the decoder 84 may be implemented within the encoder 72 and the reconstructed pictures may be used in the prediction operations of the encoding process.

Figure 2:
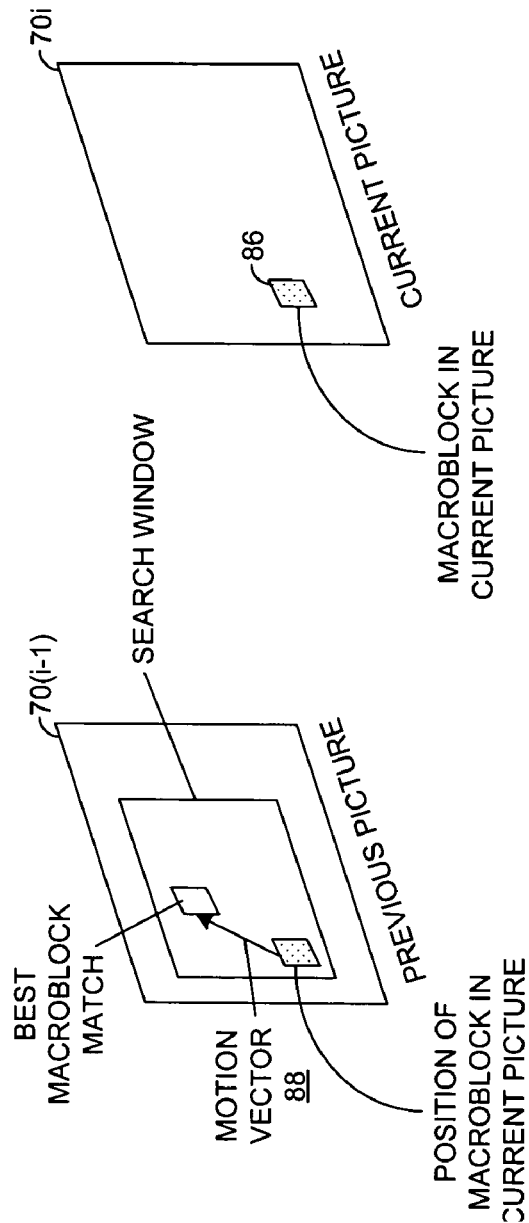
FIG. 2 is a block diagram illustrating example prediction operations.
Figure 2:
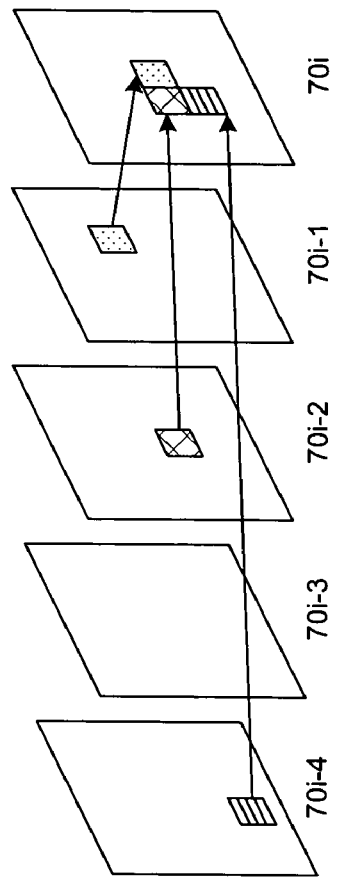

Referring to FIG. 2, a block diagram is shown illustrating example prediction operations. A picture (or video frame or field) 70i may be divided into a number of macroblocks 86 of equal size. In one example, the macroblocks 86 may be implemented as 16×16 pixels. However, other size macroblocks may be implemented to meet the design criteria of a particular application. Motion compensated prediction generally presumes that a macroblock within the current picture 70i may be modeled as a translation of a macroblock from a previous picture 70(i-l) Each macroblock 86 in the current picture 70i is generally predicted from the previous picture 70(i-l). The motion information is generally represented as a two-dimensional displacement vector or motion vector 88. Due to the block-based picture representation, motion estimation generally uses block-matching techniques that obtain the motion vector by minimizing a cost function measuring the mismatch between a candidate block and the current block. In one example, a number of previous (or reference) pictures 70(i-4), 70(i-3) ... 70(i-1) may be used to predict the macroblocks in the current picture 70i.

Figure 3:
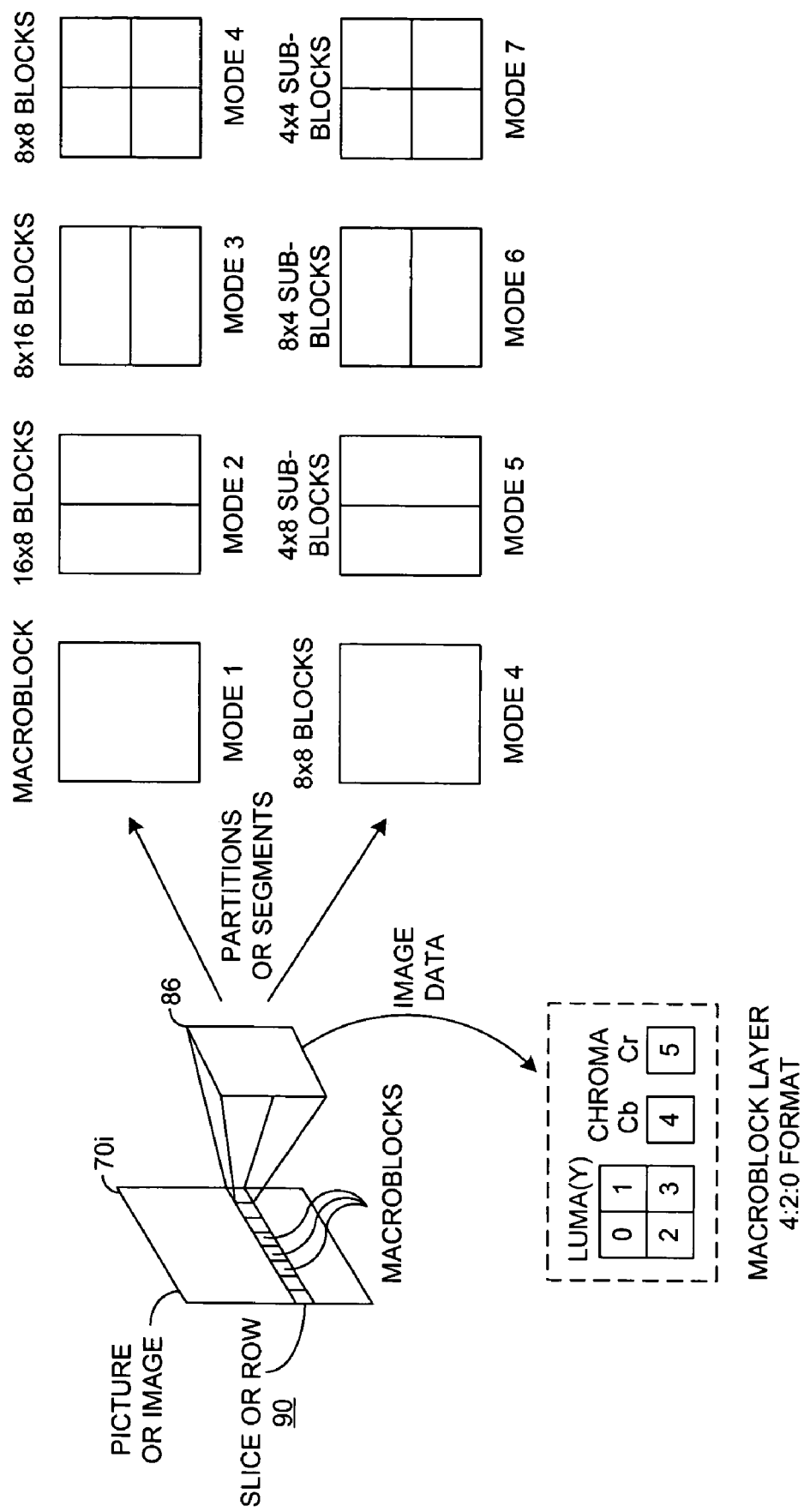
FIG. 3 is a block diagram illustrating partitions or segments of pictures.

Referring to FIG. 3, a block diagram is shown generally illustrating partitions or segments of pictures. In general, a picture (e.g., an image, a frame, a field, etc.) 70i may be divided (e.g., segmented, partitioned, etc.) into a number of macroblocks 86. The macroblocks generally comprise an array of pixels having vertical and horizontal dimensions of equal size (e.g., 32×32, 16×16, etc). The macroblocks generally comprise luminance data (e.g., luma Y) and chrominance data (e.g., blue chroma Cb and red chroma Cr). In one example, the luminance data may have a resolution that is twice that of the chrominance data (e.g., a 4:2:0 format).

The macroblocks 86 may be grouped in a number of slices 90. The slices 90 may comprise an arbitrary number of macroblocks 86. The slices 90 generally run from left to right and may comprise an entire row of the picture 70i. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. The macroblock 86 may be encoded in an inter prediction mode (e.g., compression based upon temporal redundancy) or an intra prediction mode (e.g., compression based upon spatial redundancy). In the inter prediction mode, each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

For chrominance (or chroma) samples, the prediction block is generally formed for the entire 8×8 chroma block. Both chroma Cb and chroma Cr blocks are generally processed similarly. In general, one of four prediction modes may be used (e.g., DC or mode 0, vertical or mode 1, horizontal or mode 2, and plane or mode 3).

Figure 4:
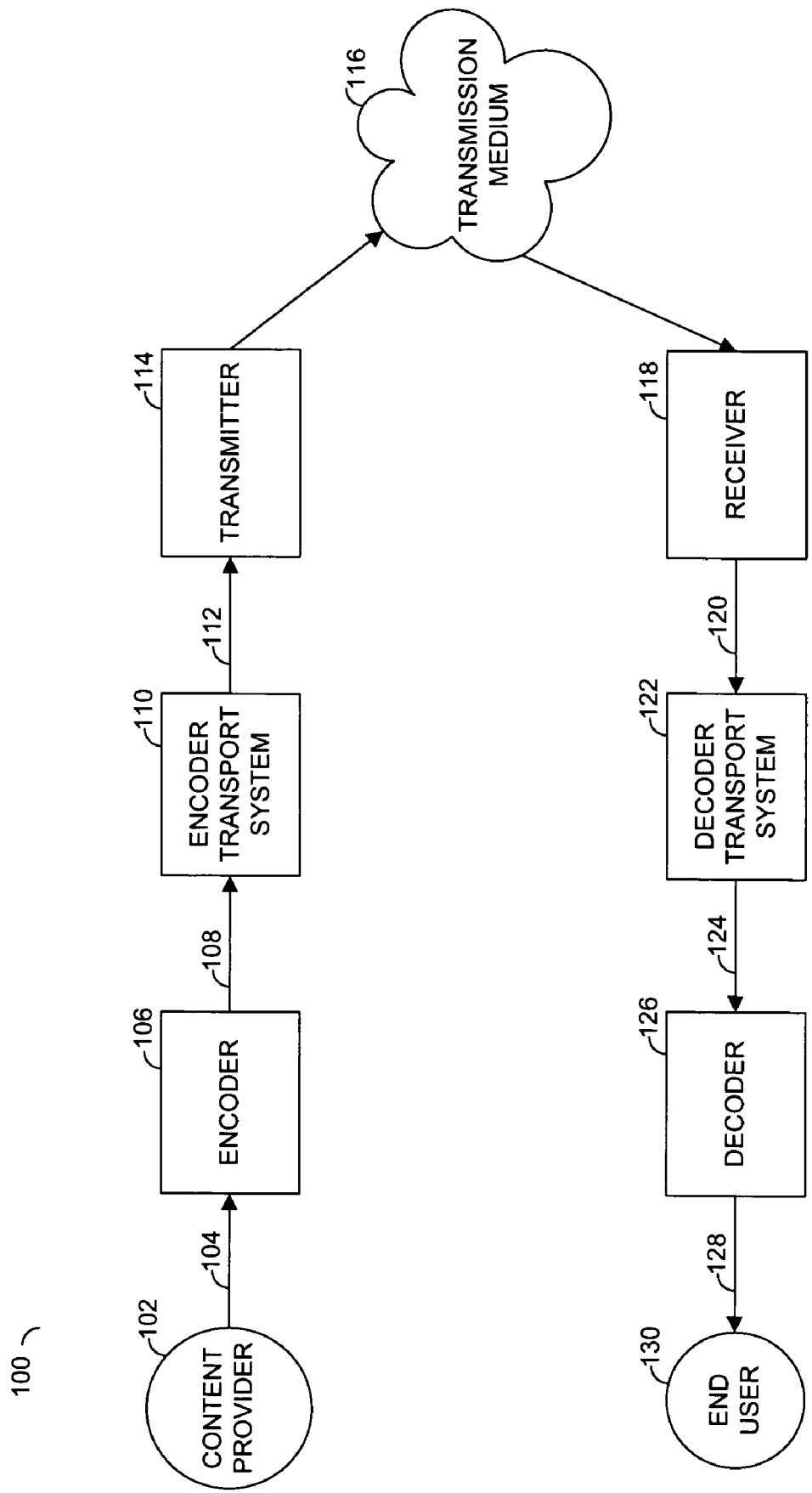
FIG. 4 is a block diagram illustrating various components of a compressed video system.

Referring to FIG. 4, a block diagram of a system 100 is shown. In general, a content provider 102 presents video image, audio or other data 104 to be compressed and transmitted to an input of an encoder 106. The compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bitstream.

On a receiving side of the system 100, a receiver 118 generally receives the compressed data bitstream from the transmission medium 116. The receiver 118 presents a bitstream 120 to a decoder transport system 122. The decoder transport system 122 generally presents the bitstream via a link 124 to a decoder 126. The decoder 126 generally decompresses the data bitstream and presents the data via a link 128 to an end user 130. The end user 130 may comprise a television, monitor, computer, projector, hard drive, or any other medium implemented to carry, transfer, present, display and/or store an uncompressed bitstream.

Figure 5:
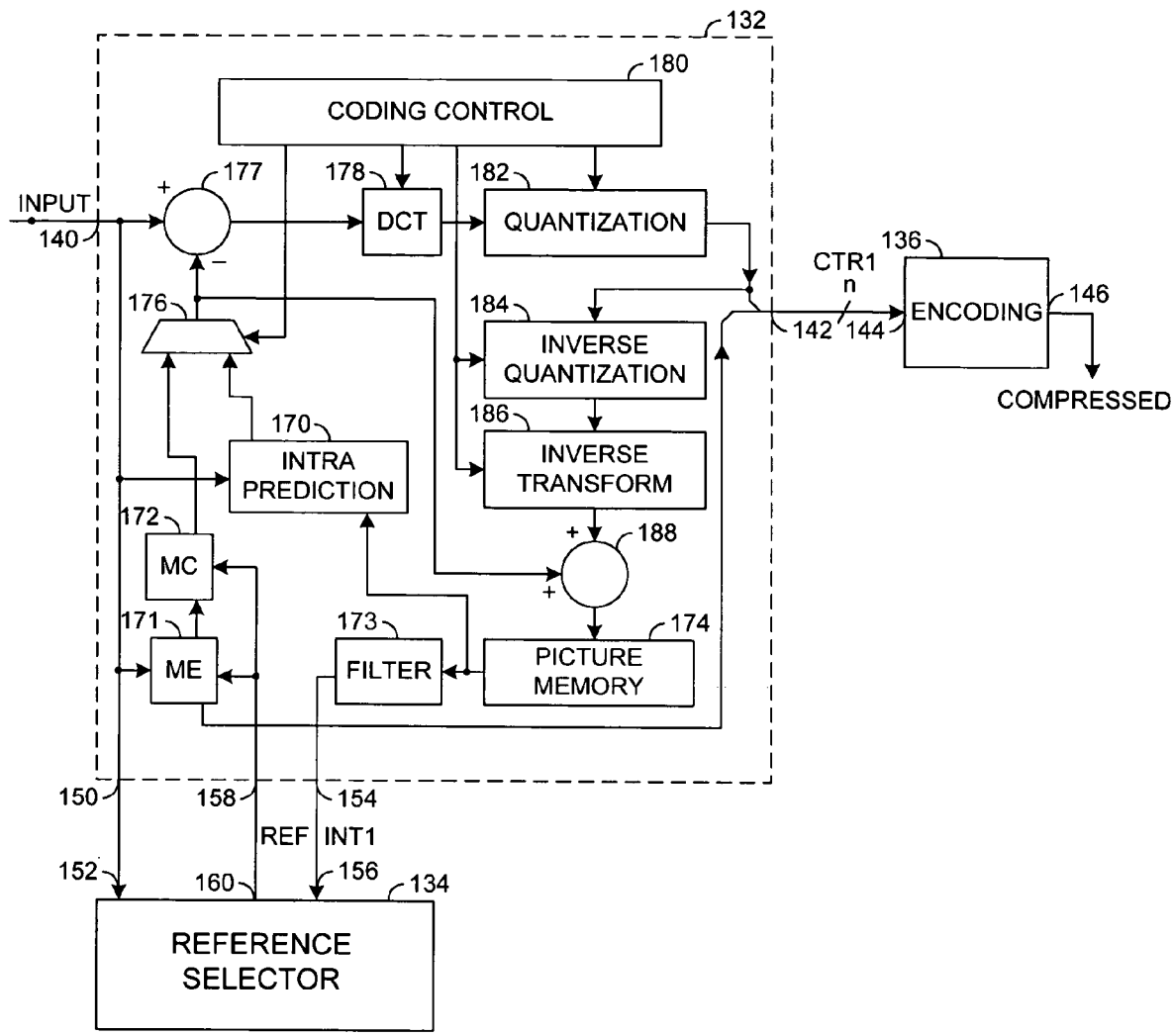
FIG. 5 is a block diagram of an encoder of FIG. 4.

Referring to FIG. 5, a block diagram illustrating an encoder 106 in accordance with a preferred embodiment of the present invention is shown. The encoder 106 may be implemented, in one example, as an H.264 compliant encoder. The encoder 106 generally comprises a processing block 132 and a processing block 134. The encoder 106 may also comprise an encoding block 136. The processing block 132 may be implemented as a general processing block. The processing block 134 may be implemented as a reference selector block.

The general processing block 132 may have an input 140 that may receive a signal (e.g., INPUT). The signal INPUT generally comprises an uncompressed digital video signal comprising a series of pictures (e.g., frames, fields, etc.). Each picture generally comprises a representation of a digital video signal at a particular time. The general processing block 132 may be configured to generate a plurality of macroblocks from each picture. The general processing block 132 may also have an output 142 that may present one or more signals (e.g., CTR1) to an input 144 of the encoding circuit 136.

The encoding circuit 136 may have an output 146 that may present a signal (e.g., OUTPUT). The signal OUTPUT may be a compressed and/or encoded bitstream, such as an H.264 compliant digital video bitstream. In one example, the encoding circuit 136 may be configured to perform entropy coding. The circuit 136 may be further configured to provide serialization (e.g., zig-zag scan) and re-ordering of the transformed and quantized pictures.

The general processing circuit 132 may have an output 150 that may present the signal INPUT to an input 152 of the reference selector block 134, an output 154 that may present a signal (e.g., INT1) to an input 156 of the reference selector block 134 and an input 158 that may receive a signal (e.g., REF) from an output 160 of the reference selector block 134. The signal INT1 may comprise, in one example, previously encoded/decoded and reconstructed samples of the pictures in the signal INPUT. The signal REF generally comprises a best reference picture for each macroblock of a current picture.

The circuit 132 generally comprises a block (or circuit) 170, a block (or circuit) 171, a block (or circuit) 172, a block (or circuit) 173, a block (or circuit) 174, a block (or circuit) 176, a block (or circuit) 177, a block (or circuit) 178, a block (or circuit) 180, a block (or circuit) 182, a block (or circuit) 184, a block (or circuit) 186 and a block (or circuit) 188. The circuit 170 may be implemented as an intra prediction circuit. The circuit 171 may be implemented as a motion estimation (ME) circuit. The circuit 172 may be implemented as a motion compensation (MC) circuit. The circuit 173 may be implemented as a deblocking (or loop) filter. The circuit 174 may be implemented as a picture memory circuit. The circuit 176 may be implemented as a selection circuit, such as a 2:1 multiplexer. The circuit 177 may be implemented as a summing circuit. The circuit 178 may be implemented as a transform circuit. In one example, the circuit 178 may be configured to perform an 4×4 integer transform or a discrete cosine transform (DCT). The circuit 180 may be implemented as a control circuit. The circuit 182 may be implemented as a quantization circuit. The circuit 184 may be implemented as an inverse quantization circuit. The circuit 186 may be implemented as an inverse transform circuit. The circuit 188 may be implemented as a summing circuit.

An output of the quantization circuit 182 and an output of the motion estimation circuit 172, may be presented in the signal CTR1 at the output 142. The signal CTR1 may also comprise, for example, motion vectors and reference information from the motion estimation block 171 and/or reference selector block 134, information regarding intra prediction modes from the intra prediction block 170, coefficients from the quantization block 182 and/or quantization parameters (QP) from the coding control block 180 (e.g., for controlling quantization step size).

The inverse quantization circuit 184 is generally configured to reverse the quantization process performed by the quantization circuit 182. The inverse transform circuit 186 is generally configured to reverse the transformation process (e.g., DCT or 4×4 integer) performed by the circuit 178. The inverse transform circuit 186 may also be referred to as an inverse DCT block or an IDCT block.

The signal INPUT may be presented to the intra prediction block 170, the motion estimation block 172 and the summing block 177. The summing block 177 may mathematically combine the signal INPUT with either (i) the output of the intra prediction block 170 or (ii) the output of the motion compensation block 172. The selection may respond to a signal provided by the control circuit 180. The signal INPUT may be compressed with the transform circuit 178. The transform circuit 178 may translate the macroblocks in the signal INPUT from time domain frames to frequency domain frames. The quantization block 182 may reduce the number of bits in a number of coefficients representing the signal INPUT. The encoding block 136 may provide entropy coding (e.g., Huffman coding, binary arithmetic coding, context adaptive binary arithmetic coding or CABAC, etc.) to implement a lossless compression having frequently occurring values represented in fewer bits.

The inverse quantization circuit 184 and the inverse transform circuit 186 may be used to decode the encoded macroblocks. The summing block 188 may provide a mathematical operation to sum the decoded macroblocks with the predicted macroblocks to form reconstructed macroblocks. By reconstructing the macroblocks, the processing block 132 generally ensures that the prediction processing is based upon the same reference as would be available during decoding (e.g., reduces drift). The reconstructed macroblocks are stored in the picture memory 174. The filter block 173 may be configured to reduce or eliminate artifacts in the reconstructed picture from the use of macroblocks.

Figure 6:
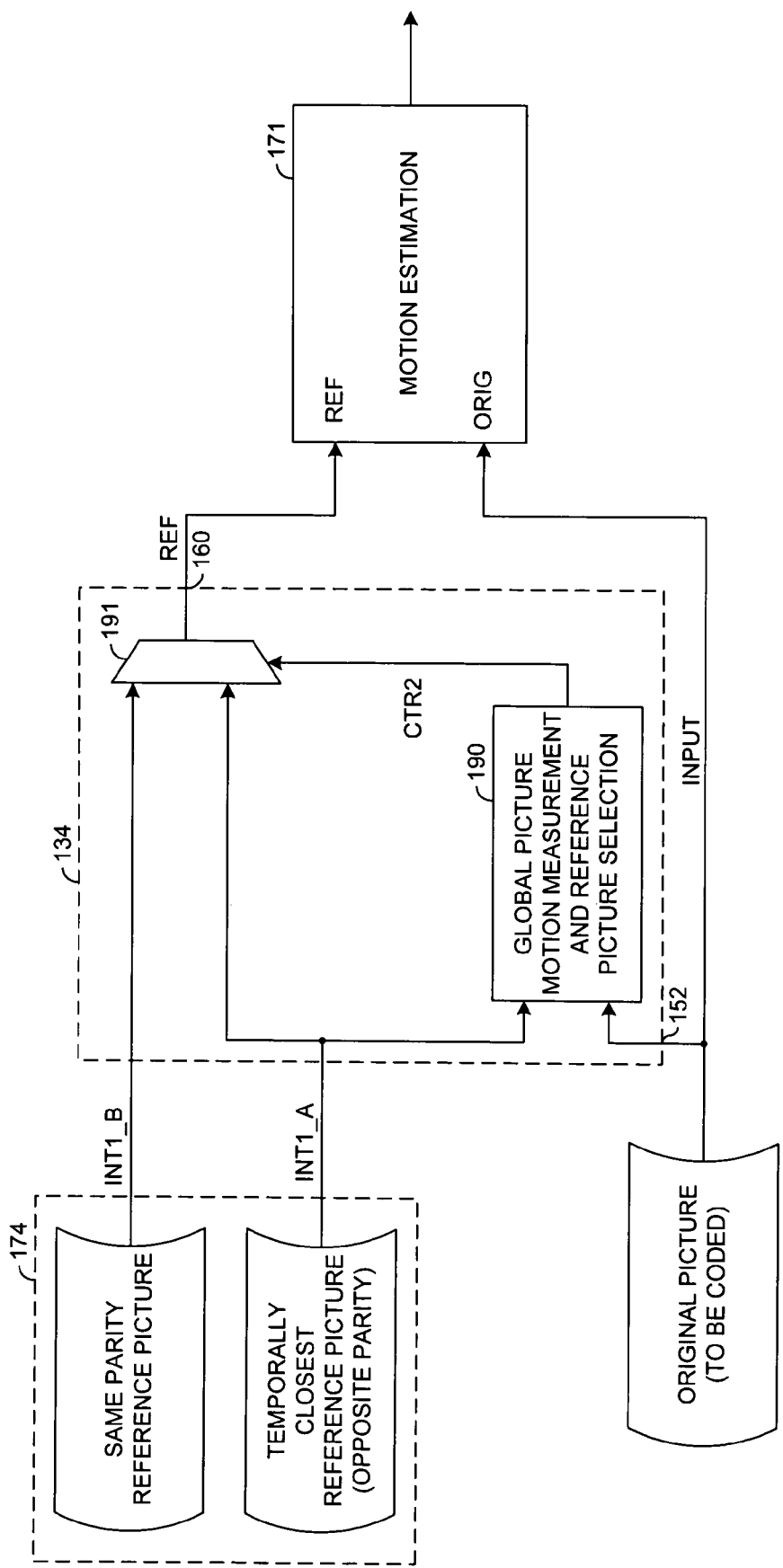
FIG. 6 is a block diagram of a reference selector block of FIG. 5.

Referring to FIG. 6, a more detailed block diagram of the circuit 134 of FIG. 5 is shown. The circuit 134 generally receives (i) a current (or original) picture (e.g., to be coded) via the signal INPUT and (ii) two reference pictures (e.g., INT1_A and INT1_B) from the picture memory 174 via the signal INT1. In a preferred embodiment, the reference picture INT1_A generally comprises a reference picture that is temporally closest (e.g., opposite parity) to the current picture. The reference picture INT1_B generally comprises a reference picture of the same parity as the current picture. However, in an alternative embodiment, the reference picture INT1_A may comprise the reference picture of the same parity as the current picture and the reference picture INT1_B may comprise the reference picture that is temporally closest to the current picture. The circuit 134 is generally configured to generate the signal REF in response to the same parity reference picture, the temporally closest reference picture and the original picture.

The circuit 134 may comprise a block (or circuit) 190 and a block (or circuit) 191. The circuit 190 may be implemented, in one example, as a global picture motion measurement and reference picture selection circuit. The circuit 191 may be implemented, in one example, as a multiplexing circuit. In one example, the circuit 191 may be implemented as a 2:1 multiplexer. The current picture may be presented to a first input of the circuit 190. The temporally closest reference picture may be presented to a second input of the circuit 190 and a first input of the circuit 191. The same parity reference picture may be presented to a second input of the circuit 191. The circuit 190 may have an output that may present a signal (e.g., CTR2) to a control input of the circuit 191. The circuit 191 may have an output that may be configured to present the signal REF. The circuit 191 is generally configured to select either the temporally closest reference picture INT1_A or the same parity reference picture INT1_B for presentation via the signal REF in response to the signal CTR2.

Figure 7:
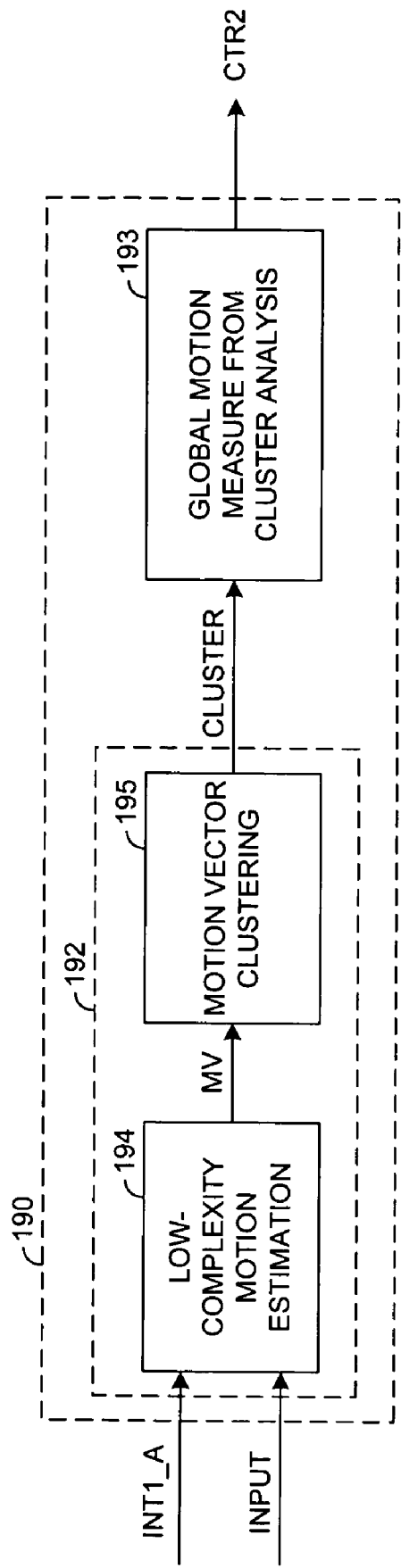
FIG. 7 is a block diagram of a motion measurement block of FIG. 6.

Referring to FIG. 7, a more detailed block diagram of the block 190 of FIG. 6 is shown. The block 190 may comprise a block 192 and a block 193. The block 192 may be implemented, in one example, as a motion vector clustering block. The block 193 may be implemented as a global motion measurement block. In one example, the block 193 may be configured to apply a predetermined threshold and cluster analysis to clusters of motion vectors in order to determine a measurement of global inter-picture motion.

The block 192 may comprise a block 194 and a block 195. The block 194 may be implemented, in one example, as a low-complexity motion estimation circuit. The block 195 may be implemented, in one example, as a motion vector clustering circuit. The block 194 may be configured to receive the temporally closest reference picture and the current picture. The circuit 194 may be configured to generate a signal (e.g., MV) in response to a low-complexity motion estimation process performed on the temporally closest reference picture and the original picture. The signal MV may comprise a number of motion vectors generated in response to a comparison between sub-blocks of the temporally closest reference picture and sub-blocks of the current picture. The block 195 may be configured to generate a number of clusters of motion vectors in response to the signal MV. The circuit 195 may be configured to generate a signal (e.g., CLUSTER) in response to the signal MV. The signal CLUSTER may be presented to an input of the circuit 193. The circuit 193 may be configured to generate the signal CTR2 in response to the signal CLUSTER and the predetermined threshold. In one example, the predetermined threshold may be programmable.

In one example, the block 190 may be configured to detect the predominant motion characteristic for a current picture (e.g., frame, field, etc.) with respect to a reference picture (e.g., frame, field, etc.). For example, the block 190 may be configured to perform a global motion component estimation. The block 194 may be configured to perform a low-resolution full search of the reference frame for every block (e.g., macroblock, sub-macroblock, etc.) of the current picture. The result of the full search may comprise a number of coarse motion vectors for each block in the current picture. In one example, the block 195 may be configured to analyze the result of the search by using a histogram technique to identify the dominant motion component for the picture. For example, the block 195 may be configured to perform a clustering analysis on the set of coarse motion vectors. An example of clustering analysis may be found in co-pending application U.S. Ser. No. 10/196,731, filed Jul. 17, 2002, which is hereby incorporated by reference in its entirety.

The characteristics of the resulting clusters may be used in the block 193 and also in a successive stage of motion estimation. Analysis of the coarse motion vector clusters may provide a measurement of global picture motion. For example, when the dominant cluster is located at the (0,0) position and represents more than the predetermined threshold of all motion vectors, the current picture and the reference picture may be considered to have near-zero global motion. When there is near-zero global motion, the same parity reference picture is generally selected for subsequent motion estimation.

In one example, the global motion component estimation may comprise the following steps: 1) Sub-sampling the current frame and the reference frame in each direction; 2) For the first N×M block in the sub-sampled current picture find the N×M block in the sub-sampled reference picture that gives the lowest value of SAD (sum of absolute differences) distortion measure; 3) The motion vector that results in the best matching 2×2 sub-sampled reference block is stored for later analysis; 4) Steps 2 and 3 may be repeated for each block in the sub-sampled current picture; 5) The list of motion vectors obtained by step 3) is analyzed to identify the dominant motion components. Sub-sampling may be done using any resolution in each direction, where X is the horizontal direction and Y is the vertical direction. In one preferred embodiment, the current and reference pictures are sub-sampled by 8 times in each direction. For example, each pixel in the sub-sampled pictures corresponds to an 8×8 pixel block in the current and reference pictures. An 8×8 averaging filter may be applied. However, any 8×8 decimation filter may be equally appropriate.

In general, any size of block that is small compared to the sub-sampled pictures may be employed in step 2. In a preferred embodiment, a block size is 2×2. In one example, the SAD operation may be expressed by the following equation:

$$SAD = \sum_{i=0}^{N} \sum_{j=0}^{M} |a(i, j) - b(i, j)|.$$

However, other distortion measurements may be implemented.

There are many appropriate methods for analyzing the list of motion vectors to determine the dominant motion components, including many well known clustering techniques. For example, K-Means or a histogram may be employed.

In a preferred method for analysis of the list of motion vectors, the following histogram technique may be implemented:

a) Each motion vector may be entered into a histogram, where the bin resolution of the histogram corresponds to a pixel block of size corresponding to the sub-sampling of step 1 above.

b) A peak detection process may be applied to identify the highest peaks in the histogram. The position of each such peak generally corresponds to a significant motion component of the current picture.

c) The motion components may be scaled by the appropriate factors to compensate for a change in resolution resulting from the sub-sampling of step 1 above. In an example with 8 times sub-sampling, the motion components may be scaled by a factor of 8 in each dimension to reflect the motion component on the correct scale for the full resolution current and reference pictures. The motion components may be (but are not necessarily) used in subsequent steps for motion estimation.

Figure 8:
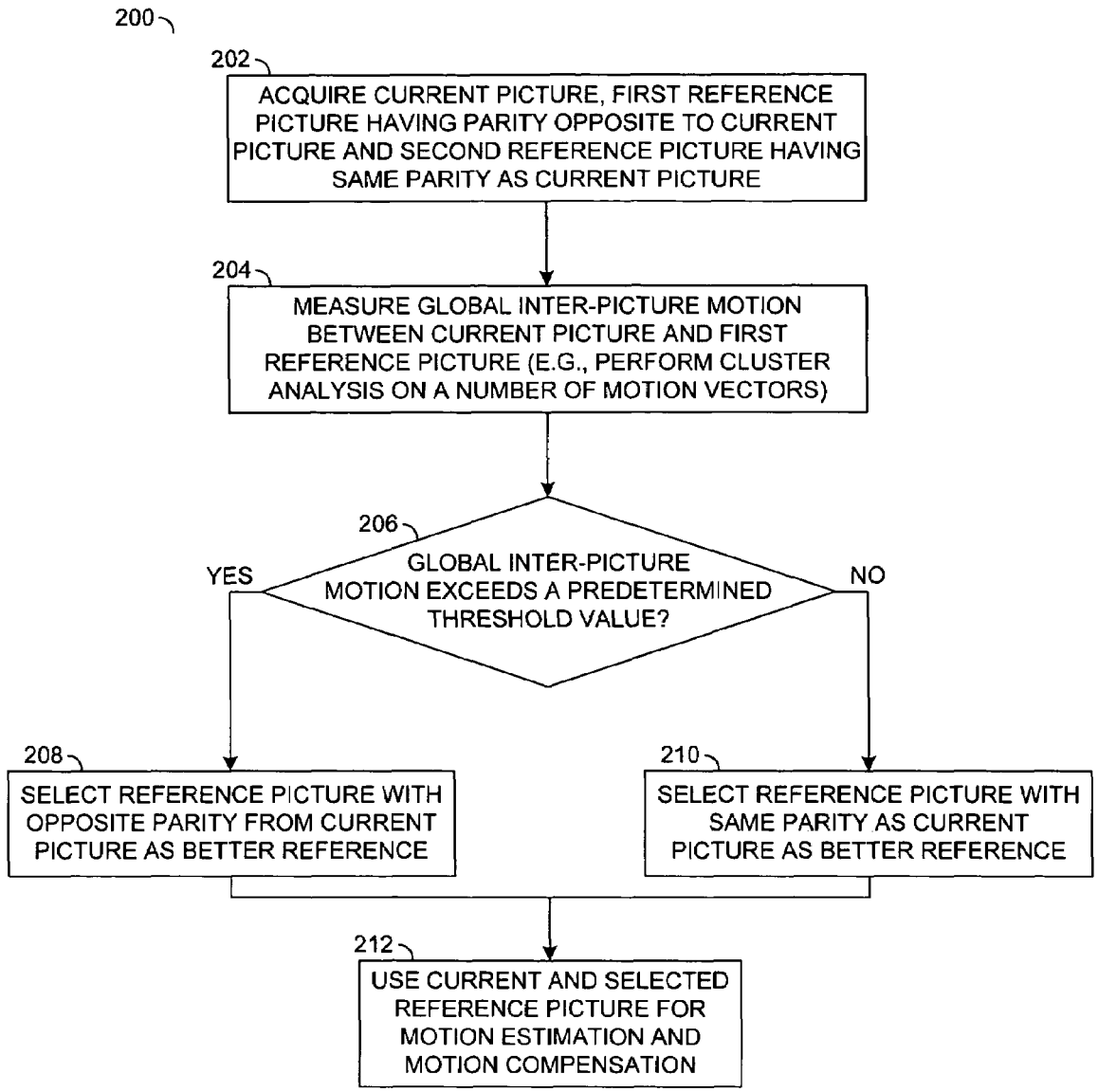
FIG. 8 is flow diagram of a motion estimation process in accordance with a preferred embodiment of the present invention.

Referring to FIG. 8, a flow diagram 200 is shown illustrating a reference picture selection process in accordance with a preferred embodiment of the present invention. The process 200 generally begins with an acquisition of a current picture, a temporally closest reference picture having a parity opposite to the current picture and a reference picture having a parity similar to the current picture (e.g., the block 202). The process 200 generally continues by measuring a global inter-picture motion estimation between the current picture and the temporally closest reference picture (e.g., the block 204). For example, the current picture and the temporally closest reference picture may be sub-sampled into a plurality of macroblocks. Each sub-sampled block of the current picture may be compared with each sub-sampled block of the reference picture to determine a best match. Each of the best matches for the plurality of macroblocks of the original picture are examined to determine a dominant motion component. In one example, the dominant motion component may be determined via a cluster analysis process. A determination is made whether the measured global inter-picture motion exceeds a predetermined threshold (e.g., the block 206). Based on the results of analyzing the dominant motion component and the predetermined threshold, either the reference picture used in the comparison is selected (e.g., the block 208) or the reference picture having the same parity as the current picture is selected (e.g., the block 210) as the best reference for subsequent motion estimation an motion compensation (e.g., the block 212).

The present invention employs a process whereby global motion components are estimated through a clustering analysis of the results of a low-resolution motion estimation process. The output of the process is a set of global motion components and the number of motion vector elements within a cluster, where each cluster corresponds to one global motion component. The global motion estimation process is use to estimate the level of overall motion between a current picture and a temporally closest reference picture (e.g., of opposite parity). Specifically, if the dominant global motion component that results from the global motion estimation is (0,0) and the cluster that corresponds to that global motion component comprises more than a certain fraction of all motion vector elements, the level of motion between the two pictures is deemed to be low. When the level of motion between the current picture and the temporally closest reference picture is low, the reference picture of the same parity as the current picture is generally selected for motion estimation. The level of motion considered to be low is generally determined by a predefined threshold. While a range of threshold values may be used, in a preferred embodiment, a threshold for the fraction of elements in the dominant motion cluster is 97% or $^{31}/_{32}$.

The present invention generally selects a reference picture parity according to a measure of inter-picture motion. In one embodiment, an analysis of a low-resolution inter-picture motion search is used to provide a measure of inter-picture motion. An advantage of the present invention is that given fixed motion estimation resources, better video compression efficiency may be achieved by directing the motion estimation to the better of two reference pictures. Furthermore, the present invention provides a method that is sufficiently flexible to use any reasonable estimate of inter-picture motion, including the specific method described above.

The above description of the invention presumes a system with a single motion estimation module, which performs motion estimation between the current picture and one reference picture. However, the present invention is equally applicable to a video coding system in which there are several such motion estimation modules. The present invention may be used to dictate the reference pictures used by each module. For example, in a system with two motion estimation modules, when there is a high degree of inter-picture motion, both motion estimation modules may be used within the reference picture, thereby creating a larger effective search area. However, when there is little inter-picture motion, better estimation may be achieved by using the motion estimation modules in different reference pictures. Application of the present invention is extensible to any number of motion estimation modules. Also, while it is most useful for field-based encoding, it may be useful for frame-based encoding.

The present invention may be applied in applications using field only coding. In one example, compression gains of up to 10% may be obtained on some sequences and about 3%-5% on average. The present invention may also be employed in frame level adaptive frame field coding. The H.264 standard generally supports coding each frame as either a frame picture or two field pictures. Encoding a frame as two field pictures may be advantageous because the second field of a frame may be predicted from the first field. For example, in interlaced sequences with high motion and for capital I frames (an I frame can typically be more efficiently coded as an I field followed by a P field). The present invention may be employed to detect the high motion and indicate that a frame should be coded as a field pair.

The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to acquire a current picture, a first reference picture and a second reference picture;
    a second circuit configured to generate a measurement of inter-picture motion between said current picture and said first reference picture by performing a global motion estimation process on said current picture and said first reference picture;
    a third circuit configured to generate a control signal in response to (i) said measurement of inter-picture motion between said current picture and said first reference picture and (ii) a predetermined threshold value;
    a fourth circuit configured to select either said first reference picture or said second reference picture as a better reference picture for subsequent motion estimation and motion compensation on said current picture in response to said control signal; and
    a motion estimation circuit configured to generate one or more motion vectors in response to said better reference picture and said current picture, wherein said current picture is encoded based upon said one or more motion vectors.

2. The apparatus according to claim 1, wherein:
    a parity of said first reference picture is opposite to a parity of said current picture; and
    a parity of said second reference picture is the same as said parity of said current picture.

3. The apparatus according to claim 1, wherein:
    a parity of said first reference picture is the same as a parity of said current picture; and
    a parity of said second reference picture is opposite to said parity of said current picture.

4. The apparatus according to claim 1, further comprising:
    a memory configured to store said current picture, said first reference picture and said second reference picture.

5. The apparatus according to claim 1, wherein said fourth circuit further comprises:
    a multiplexer circuit configured to select (i) said first reference picture for presentation as said better reference picture in response to a first state of said control signal and (ii) said second reference picture for presentation as said better reference picture in response to a second state of said control signal.

6. The apparatus according to claim 1, wherein said second circuit further comprises:
    a low-complexity motion estimation circuit configured to generate a plurality of coarse motion vectors for said current picture based upon a low-resolution inter-picture motion search of said first reference picture.

7. The apparatus according to claim 6, wherein said second circuit further comprises:
    a first analysis circuit configured to determine a dominant global motion component based upon said coarse motion vectors and generate said measurement of inter-picture motion in response to said dominant global motion component.

8. The apparatus according to claim 7, wherein said second circuit further comprises:
    a second analysis circuit configured to generate said control signal based upon a fraction of said coarse motion vectors contained in a cluster associated with said dominant global motion component and said predetermined threshold value.

9. The apparatus according to claim 7, wherein:
    said first analysis circuit is configured to perform a cluster analysis on said coarse motion vectors.

10. The apparatus according to claim 1, wherein said apparatus is part of an encoder circuit.

11. An apparatus comprising:
    means for acquiring a current picture, a first reference picture and a second reference picture;
    means for generating a measurement of inter-picture motion between said current picture and said first reference picture by performing a global motion estimation process on said current picture and said first reference picture;
    means for generating a control signal in response to (i) said measurement of inter-picture motion between said current picture and said first reference picture and (ii) a predetermined threshold value;
    means for selecting either said first reference picture or said second reference picture as a better reference picture for subsequent motion estimation and motion compensation on said current picture in response to said control signal; and
    means for generating one or more motion vectors in response to said better reference picture and said current picture, wherein said current picture is encoded based upon said one or more motion vectors.

12. A method for performing motion estimation, comprising the steps of:
    acquiring a current picture, a first reference picture and a second reference picture using a video encoder;
    generating a measurement of inter-picture motion between said current picture and said first reference picture by performing a global motion estimation process on said current picture and said first reference picture;
    generating a control signal in response to (i) said measurement of inter-picture motion between said current picture and said first reference picture and (ii) a predetermined threshold value, wherein said video encoder selects either said first reference picture or said second reference picture as a better reference picture for subsequent motion estimation and motion compensation on said current picture in response to said control signal; and
    generating one or more motion vectors in response to said better reference picture and said current picture, wherein said current picture is encoded based upon said one or more motion vectors.

13. The method according to claim 12, wherein:
a parity of said first reference picture is opposite to a parity of said current picture; and
a parity of said second reference picture is the same as said parity of said current picture.

14. The method according to claim 12, wherein:
a parity of said first reference picture is the same as a parity of said current picture; and
a parity of said second reference picture is opposite to said parity of said current picture.

15. The method according to claim 12, further comprising the step of:
storing said current picture, said first reference picture and said second reference picture in a picture memory.

16. The method according to claim 12, further comprising the step of:
generating a plurality of coarse motion vectors for said generating a plurality of coarse motion vectors for said current picture based upon a low-resolution inter-picture motion search of said first reference picture.

17. The method according to claim 16, further comprising the steps of:
determining a dominant global motion component based upon said coarse motion vectors; and
generating said measurement of inter-picture motion in response to said dominant global motion component.

18. The method according to claim 17, further comprising the step of:
generating said control signal having (i) a first state in response to said measurement of inter-picture motion exceeding said predetermined threshold value and (ii) a second state in response to said measurement of inter-picture motion not exceeding said predetermined threshold value.

19. The method according to claim 17, further comprising:
performing a cluster analysis on said coarse motion vectors.

20. The method according to claim 12, wherein said current picture, said first reference picture and said second reference picture each comprise a field picture.

21. The method according to claim 12, wherein said predetermined threshold value is programmable.

22. The apparatus according to claim 1, wherein said first reference picture comprises a temporally closest reference picture to said current picture.

23. The method according to claim 17, further comprising the step of:
generating said control signal based upon a fraction of said coarse motion vectors contained in a cluster associated with said dominant global motion component and said predetermined threshold value.

* * * * *